United States Patent Office 3,546,471
Patented Dec. 8, 1970

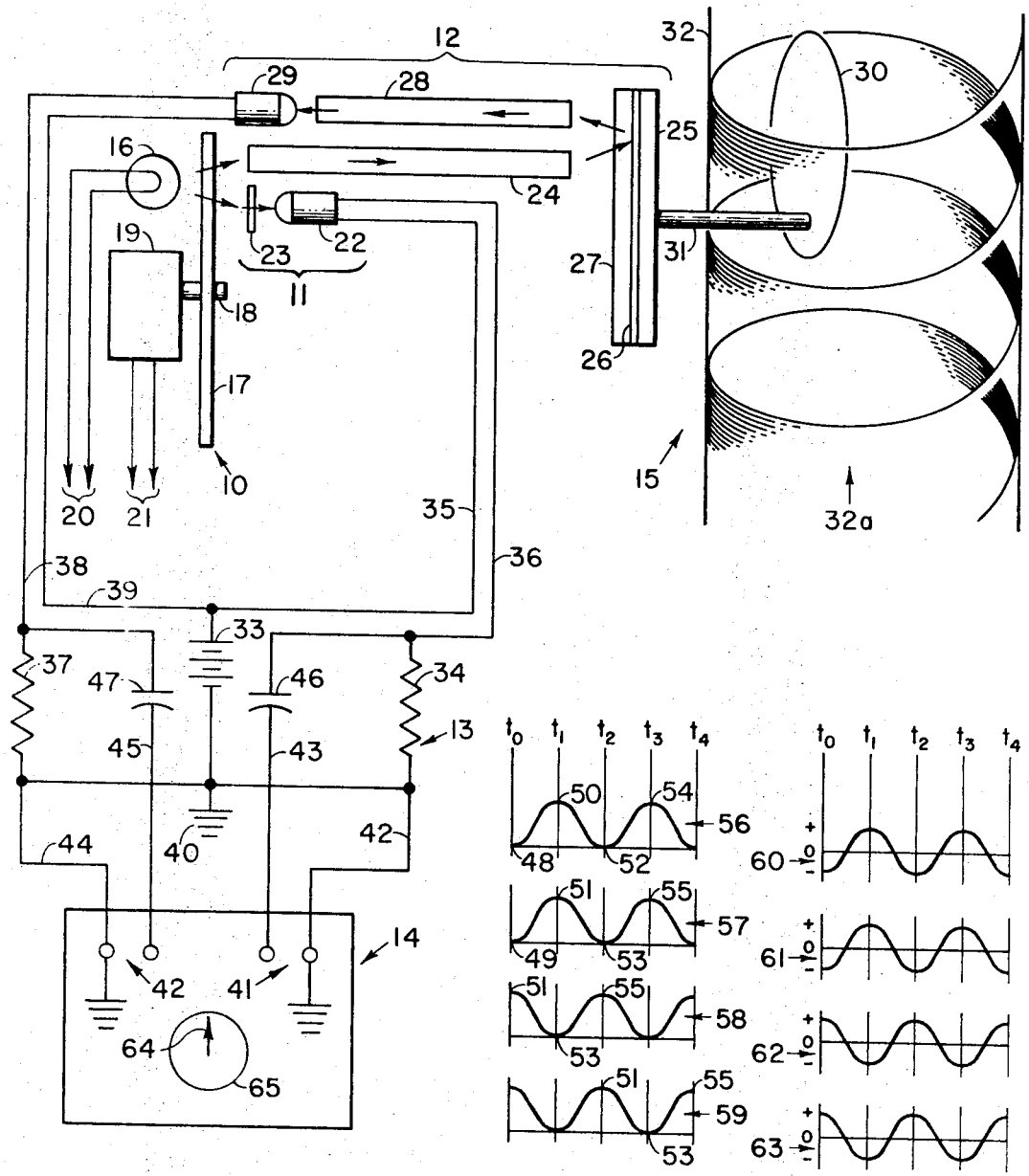

3,546,471
FLOW ANGLE SENSOR AND READ OUT SYSTEM
Victor S. Peterson, Sandusky, and Irving G. Hansen, Bellevue, Ohio, assignors to the United States of America as represented by the Administrator of the National Aeronautics and Space Administration
Filed Dec. 30, 1966, Ser. No. 606,463
Int. Cl. H03k 13/00
U.S. Cl. 250—225     10 Claims

ABSTRACT OF THE DISCLOSURE

A flow angle read-out system having a polarizing filter disc interposed between a source of rotating plane-polarized light and, a light sensitive resistor connected in circuit with a resistor and a D.C. source to produce a timewise variable voltage of cyclically varying magnitude controlled by the position of a flow vane attached to the polarizing filter disc and subject to a swirling fluid in a duct. A phase meter is connected to the resistor and to a reference source of varying amplitude voltage to measure the phase angle between the voltages thereof, which phase angle is indicative of the flow vane position and the fluid flow angle.

---

The invention described herein was made by employees of the United States Government and may be manufactured and used by or for the Government for governmental purposes without the payment of any royalties thereon or therefor.

This invention relates to angle indicating devices for use with flowing fluids and is directed more particularly to a flow angle sensor and remote read-out system for use with cryogenic fluids.

At the present time experimental work is being done with regard to driving turbines with cryogenic fluids for space applications. In such work, it is necessary to monitor the flow angle of a swirling cryogenic fluid being supplied to the turbine so that the flow angle at any given time can be correlated to the performance of the turbine. Because of the explosive nature of many cryogenic fluids and the resulting danger to personnel, it is necessary to provide read-outs of the various parameters of a particular cryogenic fluid being fed to a turbine at stations remote from the locations of various sensing devices associated with the cryogenic fluid.

The flow angle of the cryogenic fluid may be transmitted from the inside of a duct carrying the fluid to an outside point by means of a shaft connected to a flow vane positioned inside the duct. However, any indicating device to which the shaft is connected must impose a minimum work load or drag on the shaft and the vane in order that the vane may respond quickly and accurately to changes in the flow angle of the cryogenic fluid.

Accordingly, it is an object of the invention to provide an improved flow angle indicator having a read-out remote from a sensor positioned in a fluid which may be dangerous to personnel.

It is another object of the invention to provide a flow angle sensor and remote read-out system having a fast response time to variations in cryogenic fluid flow angle.

It is a further object of the invention to provide a fluid flow angle indicating device in which a vane positioned in the cryogenic fluid generates an electrical signal indicative of its position with no work load being imposed on the vane by the elements which produce the electrical signal and with a high degree of accuracy.

It is still another object of the invention to provide structure and circuitry for generating light beams of cyclically varying intensities which have a phase relationship determined by the position of a vane in a flowing fluid. These varying intensity light beams are then utilized to generate respective, correspondingly varying voltages which are supplied to a phase angle meter. An indicator on the phase angle meter provides a read-out of the flow angle of the fluid.

Other objects and advantages of the invention will become apparent from the following description and the accompanying drawing in which:

FIG. 1 is a combined schematic diagram and diagrammatical view of the structure embodying the invention;
FIG. 2 is an illustration of the variations of light beam intensities at various points in the structure; and, FIG. 3 is a representation of voltage waveshapes produced by the light beam variations.

Referring now to FIG. 1 it will be seen that the structure embodying the invention may in general terms comprise a means 10 for generating a plane-polarized rotating light beam, a reference light beam gate means 11, a flow angle responsive light gate beam means 12, an electric signal generating circuit 13, an electric phase meter 14, and a flow angle transmitting means 15. It will be obvious to those skilled in the art that an oscilloscope or other appropriate device may be substituted for the electric phase meter 14.

The means for generating a plane-polarized rotating beam of light may include a constant intensity light source such as an incandescent lamp 16 and a first light polarizing disc 17 mounted for rotation on a shaft 18 of a suitable electric motor 19. The lamp 16 is connected to a source of D.C. voltage 20 while the motor 19 is connected to a suitable source of electrical power 21.

In order to generate a reference light beam which will fall upon a light sensitive resistor 22 in the light gate 11 and the intensity of which varies cyclically, a fixed polarizing filter 23 is interposed between the polarizing disc 17 and the light sensitive resistor 22. Because the filter 23 is polarized, maximum transmission of the rotating beam of plane polarized light occurs twice during each 360° of rotation. As a result, the light striking the light sensitive resistor 22 reaches a maximum and a minimum twice during each 360° rotation of the rotating light beam. The resistor 22 and the filter 23 comprise a reference light beam gate.

To the end that a second light beam of cyclically varying intensity may be generated, light which has passed through the polarizing disc 17 from the incandescent lamp 16 is transmitted through a first light transmitting means such as a quartz rod 24 to a circular backing plate 25 having a mirror 26 and a second polarizing filter disc 27 mounted thereon. The light transmitted by the rod 24, after passing through the filter disc 27, is reflected from the mirror 26 and is transmitted by a second light transmitting means such as a quartz rod 28 to a light sensitive resistor 29 positioned to receive light from the quartz rod 28. The quartz rods 24, 28, the resistor 29, the backing plate 25, mirror 26, and the filter discs 27 make up the flow angle responsive light beam gate 12.

As will be explained presently, the phase relationship between the light beams falling on the light sensitive resistors 22 and 29 varies in accordance with the angular rotation of the backing plate 25 from a predetermined position. The backing plate 25 rotates with a fluid flow vane 30 which drives the backing plate by means of a shaft 31. The vane 30 is positioned in a duct 32 carrying a swirling cryogenic fluid 32a.

With the structure thus fare described, a first reference light beam of varying intensity falls on the light sensitvie resistor 22 while a second light beam of varying intensity, but which may be varied phase-wise with respect to the reference light beam by rotation of the backing plate 25, falls on the light sensitive resistor 29. In order that the light beams falling on the respective light sensitive resistors 22 and 29 may generate correspondingly varying electrical voltages, the light sensitive resistor 22 is connected between the positive pole of a D.C. source 33 and one end of a resistor 34 by means of leads 35 and 36, while the light sensitive resistor 29 is connected between the positive pole of the D.C. source 33 and a resistor 37 through leads 38 and 39. The ends of the resistors 34 and 37 not connected to the light sensitive resistors 22 and 29, respectively, are grounded as at 40 together with the negative pole of the D.C. source 33.

It will be seen that with the foregoing circuit arrangement, the light sensitive resistor 22 and the resistor 34 are serially connected across the D.C. source 33. Similarly, the light sensitive resistor 30 and the resistor 37 are serially connected across the D.C. source 33. Thus, as a resistance of the light sensitive resistors 22 and 29 varies in accordance with the intensity of the respective light beams falling thereon, the magnitude of the voltage across the resistors 34 and 37 will vary inversely to the resistance of the respective light sensitive resistors 22 and 29. Thus the resistors 34 and 37 serve as signal generating means.

Because the phase angle between the varying intensity light beams is variable, the phase angle between the voltages produced on the resistors 34 and 37 will be variable in a corresponding manner. To measure the phase angle between the voltages on the resistors 34 and 37, a first pair of input terminals 41 of the phase angle meter 14 are connected across the resistor 34 by means of leads 42 and 43 while a second pair of input terminals 42 of the phase angle meter are connected across the resistor 37 through leads 44 and 45.

The phase angle between the voltages on the resistors 34 and 37 is indicated by a needle 64 of a meter 65 on the phase angle meter 14. This phase angle is equal to the phase angle between the first and second light beams of cyclically varying intensity which, in turn, is dependent on the angular rotation of the backing plate 25 about the shaft 31 from a predetermined position. Consequently, the position of the needle 48 is indicative of the position of the flow vane 30 and the flow angle of the cryogenic fluid 32a.

Capacitors 46 and 47 are inserted in the leads 43 and 45, respectively, to prevent D.C. from flowing to the terminals 41 and 42 of the phase angle meter 14. Accordingly, the voltages supplied to the terminals 41 and 42 vary above and below a zero reference level as required by the phase angle meter 14.

Operation of the above-described structure and circuitry will now be described. Assuming that at some time $t_0$ the polarizing filter disc 27 and the polarizing filter 23 are orientated to pass light polarized in the plane of the drawing while the polarizing filter disc 17 is orientated to pass light in a plane perpendicular to that of the drawing, the intensity of the light impinging on the light sensitive resistors 22 and 29 will be at a minimum as indicated at 48 and 49, respectively, in FIG. 2. If now, the polarizing filter disc 17, as viewed from the position of the light sensitive resistor 22, is rotated in a clockwise direction, the intensity of the light being received by the light sensitive resistors 22 and 29 will increase, reaching a maximum value at time $t_1$ when the polarizing filter 17 has rotated 90° from its original position. This occurs because the light beam passing through the polarizing filter disc 17 is now polarized in the plane of the drawing and, consequently, the intensity of the light passed by the polarizing filters 23 and 27 is maximum. These maximum values are indicated at 50 and 51 in FIG. 2.

As the polarizing filter disc 17 rotates through an additional 180° the intensities of the light beams falling on each of the light sensitive resistors 22 and 29 passes through respective minimum values 52 and 53 and respective maximum values 54 and 55. Accordingly, it will be seen that for each 360° of rotation of the filter disc 17, the first and second light beams falling on the respective resistors 22 and 29 each complete two cycles of intensity variations.

As indicated previously, the cyclically varying light falling on the light sensitive resistor 29 may be varied phase-wise with respect to the cyclically varying light striking the light sensitive resistor 22 by angular rotation of the polarizing filter disc 27 from a predetermined position. This phase shift is illustrated in FIG. 2 where 56 indicates the waveshape of the intensity of the first cyclically varying light beam striking the light sensitvie resistor 22 and, 57 indicates the waveshape of the intensity of the second cyclically varying light beam falling on the light sensitve resistor 29 when the filter disc 27 is orientated to pass light in the plane of the drawing.

Assuming that the light polarizing filter disc 27, as viewed from the vane side, rotates 90° counterclockwise from its original predetermined position, the cyclically varying second light beam falling on the light sensitive resistor 29 will be advanced 180° as indicated at 58 in FIG. 2. On the other hand, if the light polarizing filter disc 27 is rotated 90° clockwise from its original position at $t_0$, the light imposed on the light sensitive resistor 29 will be retarded 180° as indicated at 59 in FIG. 2. Thus the second cyclically varying light beam is variable relative to time. Consequently, since the first cyclically varying light beam is fixed relative to time, its phase relationship to the second cyclically varying light beam changes as the second beam varies timewise.

From the foregoing it will be seen that a 90° rotation of the vane 30 causes a 180° shift of the second light beam. Accordingly, because standard phase meters are limited to detect phase shifts of less than 360°, the vane 30 and the polarizing filter disc 27 are restricted to an angular rotation of less than 180°.

The waveshapes shown in FIG. 3 each illustrate two complete cycles of sinusoidal variation which are generated by a 360° rotation of the polarizing filter disc 17 during the time interval between $t_0$ and $t_4$. Since the filter disc 17 is rotated at a constant speed by the motor 19, each of the light beams will complete two cycles of intensity variation for each 360° rotation of the disc 17, each rotation being equal in duration of time to the interval between $t_0$ and $t_4$.

As indicated previously, the resistance of the light sensitive resistor 22 varies in accordance with the intensity of the light falling thereon. Since the light sensitive resistor 22 and the resistor 34 are serially connected across the D.C. source 33, the voltage on the resistor 34 increases when the resistance of the light sensitive resistor 22 decreases and decreases when the resistance of the light sensitive resistor 22 increases. Consequently, the voltage on the resistor 34 increases and decreases in a cyclic manner corresponding to the varying intensity of the light striking the light sensitive resistor 22.

The waveshape of the voltage supplied from the resistor 34 to the terminals 41 of the phase meter 14 is indicated at 60 in FIG. 3. It will be seen that this voltage varies above and below a zero reference axis. This swing of the voltage about a zero level results from the blocking action of the capacitor action 46 whereby D.C. is prevented from being applied to the terminals 41. The voltage waveshape shown at 60 corresponds to the waveshape 56 which represents the light impinging the light sensitive resistor 22.

An alternating voltage is developed on the resistor 37 by the varying resistance of the light sensitive resistor 29 in the same manner as the generating of voltage on resistor 34 by the resistance variations of the light sensitive resistor 22. The waveshape of the voltage supplied to the input terminals 42 of the phase meter 14 from resistor 37 when the filter disc 27 is oriented to pass light polarized in the plane of the drawing is indicated at 61 in FIG. 3 and corresponds to the light waveshape 57 of FIG. 2. The voltage waveshape 61 swings about a zero level reference axis due to the D.C. blocking action of capacitor 47.

The alternating voltage supplied to the input terminals 42 of the phase meter 14 will be advanced as indicated at 62 or retarded as indicated at 63 in a manner corresponding to the advancing or the retarding of the light intensity striking the light sensitive resistor 29 as illustrated at 58 and 59, respectively.

From the foregoing it will be seen that the angular position of the vane 30 determines the phase relationship of an alternating voltage applied to the input terminals 42 of the phase meter 14 relative to a reference alternating voltage applied to the input terminals 41 thereof. Accordingly, the phase angle between the alternating voltages as indicated by the phase meter 14 is indicative of the angular position of the vane 30 and, consequently, of the flow angle of the cryogenic fluid 32a traversing the duct 32.

It will be understood that changes and modifications may be made to the foregoing structure and circuitry without departing from the spirit and scope of the invention as set forth in the claims appended hereto.

What is claimed is:

1. In a device adapted to provide a remote read-out of the flow angle of a swirling fluid traversing a duct having a flow vane positioned therein, in combination;
    means for generating a rotating plane-polarized light beam;
    reference light gate means positioned in said light beam and having a cyclically varying resistance corresponding to and synchronized with the angular rotation of said light beam;
    flow angle light responsive gate means positioned in said light beam and operatively connected to said flow vane, said flow angle light responsive gate means having a cyclically varying resistance which varies phase-wise with respect to the varying resistance of said reference light gate means in accordance with the angular position of said vane;
    a D.C. source;
    first signal generating means connected in circuit with said D.C. source and said reference light gate means to produce a cyclically varying voltage across said first signal generating means;
    second signal generating means connected in circuit with said D.C. source and said flow angle responsive light gate means to produce a cyclically varying voltage across said second signal generating means; and
    phase angle measuring means connected to said first signal generating means and to said second signal generating means to indicate the flow angle of said swirling fluid.

2. The remote read-out flow angle sensor of claim 1 in which said means for generating a rotating plane-polarized beam of light comprises;
    a polarized filter disc mounted on a shaft of an electric motor for rotation at a constant angular velocity; and
    a constant intensity light source positioned to one side of said disc between the axis of rotation and the periphery thereof.

3. The device set forth in claim 2 in which said constant intensity light source is an incandescent lamp energized from a D.C. source.

4. The device as set forth in claim 3 in which said reference light gate means comprises;
    a first light sensitive resistor positioned to intercept light from said means for generating a plane-polarizing light beam and, a first polarizing filter interposed between said first light sensitive resistor and the last named means;
    and in which said flow angle light responsive gate means comprises;
    a second light sensitive resistor positioned to intercept light from said means for generating a plane-polarized light beam and, a second polarizing filter mechanically connected to said flow vane to rotate therewith, said second polarizing filter being interposed between said second light sensitive resistor and the last named means whereby rotation of said flow vane from a predetermined position changes the phase relationship between the light striking said second light sensitive resistor and the light striking said first light sensitive resistor.

5. The device set forth in claim 1 in which said reference light gate means comprises;
    a first light sensitive resistor positioned to intercept light from said means for generating a plane-polarized light beam and, a first polarizing filter interposed between said first light sensitive resistor and the last named means;
    and in which said flow angle light responsive gate means comprises;
    a second light sensitive resistor positioned to intercept light from said means for generating a plane-polarized light beam; and
    a second polarizing filter mechanically connected to said flow vane to rotate therewith, said second polarizing filter being interposed between said second light sensitive resistor and the last named means whereby rotation of said flow vane from a predetermined position changes the phase relationship between the light striking said second light sensitive resistor and the light striking said first light sensitive resistor.

6. The device as set forth in claim 5 in which said means for generating a rotating plane-polarized beam of light comprises;
    a polarized filter disc mounted on a shaft of an electric motor for rotation at a constant angular velocity; and
    a constant intensity light source positioned to one side of said disc between the axis of rotation and the periphery thereof.

7. The device as set forth in claim 6 in which said phase measuring means is a phase meter having first and second pairs of input terminals and including;
    a first D.C. blocking capacitor connected between said first pair of input terminals and said first signal generating means; and
    a second D.C. blocking capacitor connected between said second pair of input terminals and said second signal generating means.

8. The device set forth in claim 1 in which said phase measuring means is a phase meter having first and second pairs of input terminals and including;
    a first D.C. blocking capacitor connected between said first pair of input terminals and said first signal generating means; and
    a second D.C. blocking capacitor connected between said second pair of input terminals and said second signal generating means.

9. The device set forth in claim 1 in which said flow angle light responsive gage means comprises;
    a mirrored disc;
    a shaft interconnecting said mirrored disc and said flow vane, the reflective side of said mirrored disc facing away from said duct;

a polarizing filter disc attached to the reflective side of said mirrored disc;

a light sensitive resistor connected in circuit relationship with said first signal generating means;

a first quartz rod having one end positioned to intercept said rotating plane-polarized light beam and the other end positioned adjacent said polarizing filter disc; and a second quartz rod having one end positioned adjacent to said polarizing filter disc near said other end of said first quartz rod, the other end of said second quartz rod being positioned adjacent to said light sensitive resistor to direct a beam of cyclically varying light thereon.

10. The device as set forth in claim 9 in which said means for generating a rotating plane-polarized beam of light comprises;

a first polarizing filter disc mounted on a shaft of an electric motor for rotation at a constant angular velocity; and a constant intensity light source positioned to one side of said first disc between the axis of rotation and the periphery thereof.

References Cited

UNITED STATES PATENTS

| | | | |
|---|---|---|---|
| 3,087,148 | 4/1963 | Ludewig | 356—33 |
| 3,096,444 | 7/1963 | Seward | 340—347 |
| 3,171,034 | 2/1965 | Tomasulo et al. | 340—347 |
| 3,351,768 | 11/1967 | Cooke | 250—220 |
| 3,403,392 | 9/1968 | Wogatzke | 340—347 |

MAYNARD R. WILBUR, Primary Examiner

J. GLASSMAN, Assistant Examiner

U.S. Cl. X.R.

340—347